(12) United States Patent
Aaron

(10) Patent No.: US 7,464,703 B2
(45) Date of Patent: Dec. 16, 2008

(54) SUN TRACKER FOR SOLAR PANELS

(76) Inventor: Jack Aaron, 21802 Twinford Dr., Lake Forest, CA (US) 92630

( * ) Notice: Subject to any disclaimer, the term of this patent is extended or adjusted under 35 U.S.C. 154(b) by 174 days.

(21) Appl. No.: 11/494,953

(22) Filed: Jul. 28, 2006

(65) Prior Publication Data

US 2007/0051401 A1    Mar. 8, 2007

Related U.S. Application Data

(60) Provisional application No. 60/709,415, filed on Aug. 18, 2005.

(51) Int. Cl.
*F24J 2/38* (2006.01)

(52) U.S. Cl. .................. 126/605; 126/600; 254/264

(58) Field of Classification Search ............. 126/600, 126/606, 572, 605, 576, 577, 573; 254/91
See application file for complete search history.

(56) References Cited

U.S. PATENT DOCUMENTS

| 4,129,360 | A | * | 12/1978 | Deflandre et al. | 359/853 |
| 4,145,021 | A | * | 3/1979 | Gaechter et al. | 248/371 |
| 4,172,442 | A | * | 10/1979 | Boblitz | 126/591 |
| 4,512,334 | A | * | 4/1985 | Peachey | 126/618 |
| 4,632,091 | A | * | 12/1986 | Wiens | 126/578 |
| 7,202,457 | B2 | * | 4/2007 | Janus et al. | 250/203.4 |

* cited by examiner

*Primary Examiner*—Steven B. McAllister
*Assistant Examiner*—Chuka C Ndubizu
(74) *Attorney, Agent, or Firm*—Herbert Shapiro

(57) ABSTRACT

The elevation of a solar panel to follow the course of the sun is achieved in a manner to require relatively little power. The elevation mechanism utilizes a system of wires and pulleys which cooperate with springs which are compressed when the panel is in the collapsed position. The springs operate to overcome inertia when panel elevation first commences. The wire and pulley system operates to extend in opposite directions a pair of arms, one connected to the panel base member, the other connected to the top of the panel pivoting member.

10 Claims, 4 Drawing Sheets

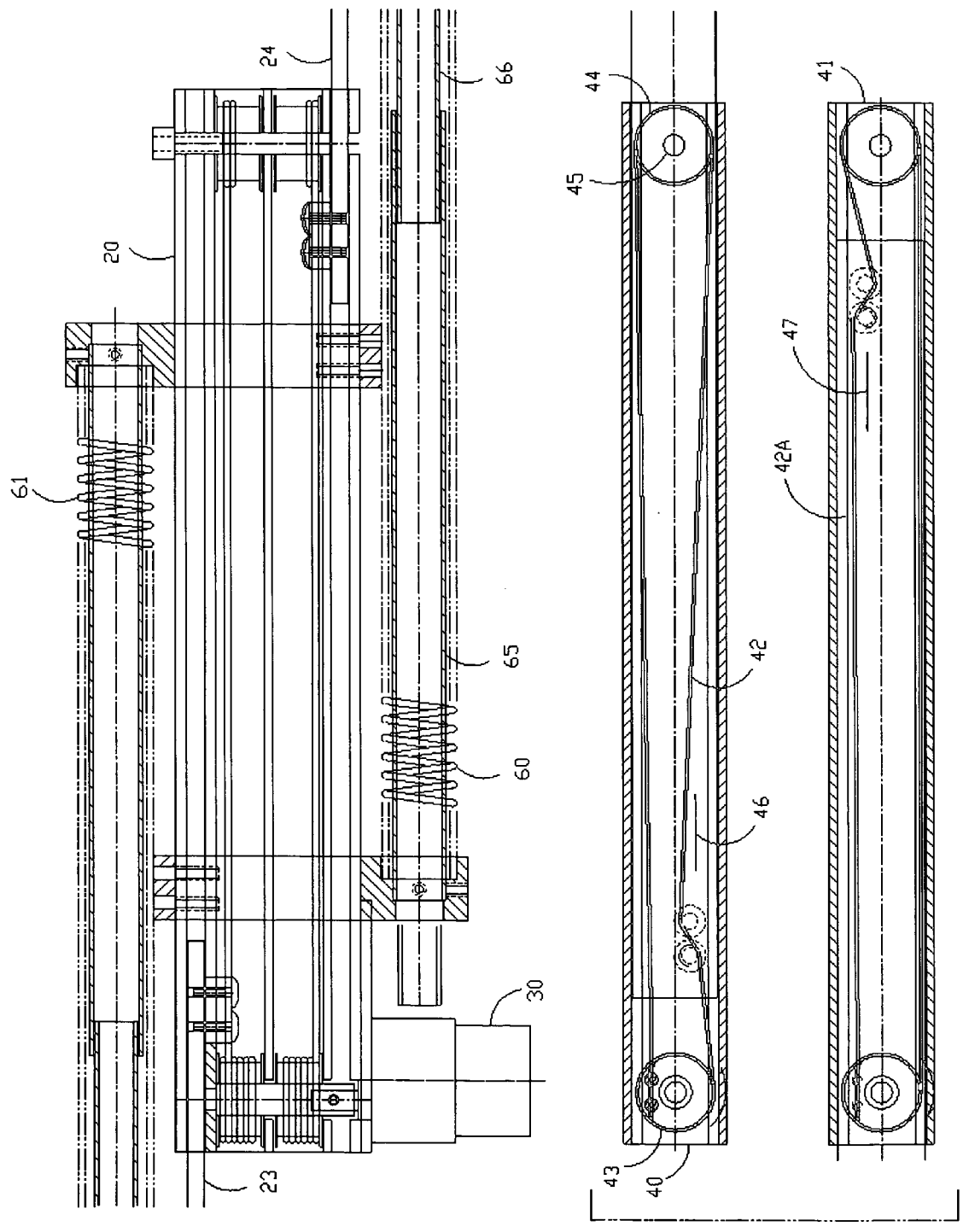

SUN TRACKER FOR SOLAR PANELS

CROSS REFERENCE TO RELATED APPLICATIONS

The present application claims the benefit of priority of provisional application Ser. No. 60/709,415 filed Aug. 18, 2005 for Jack Aaron.

FIELD OF THE INVENTION

This invention relates to a solar panel including apparatus for adjusting the orientation of the panel on a mobile platform such as a recreational vehicle, and more particularly to such apparatus which requires relatively little energy.

BACKGROUND OF THE INVENTION

Recreational vehicles equipped with solar panels are well known. But few include such panels equipped to follow the position of the sun. The primary reason for this is the high power required for operation of a sun tracker and the lack of spare power in recreation vehicles.

BRIEF DESCRIPTION OF THE INVENTION

In accordance with the principles of this invention a system of pulleys is operative in cooperation with a spring system to provide for a low power operation for moving a pair of rods in opposite directions along parallel axes in a manner to elevate and collapse a solar panel in order to follow the position of the sun.

BRIEF DESCRIPTION OF THE DRAWINGS

FIGS. 3, 6, 7 and 8 are schematic side views of portions of the apparatus of FIGS. 1 and 2.

DETAILED DESCRIPTION OF ILLUSTRATIVE EMBODIMENTS OF THIS INVENTION

Figure 1:
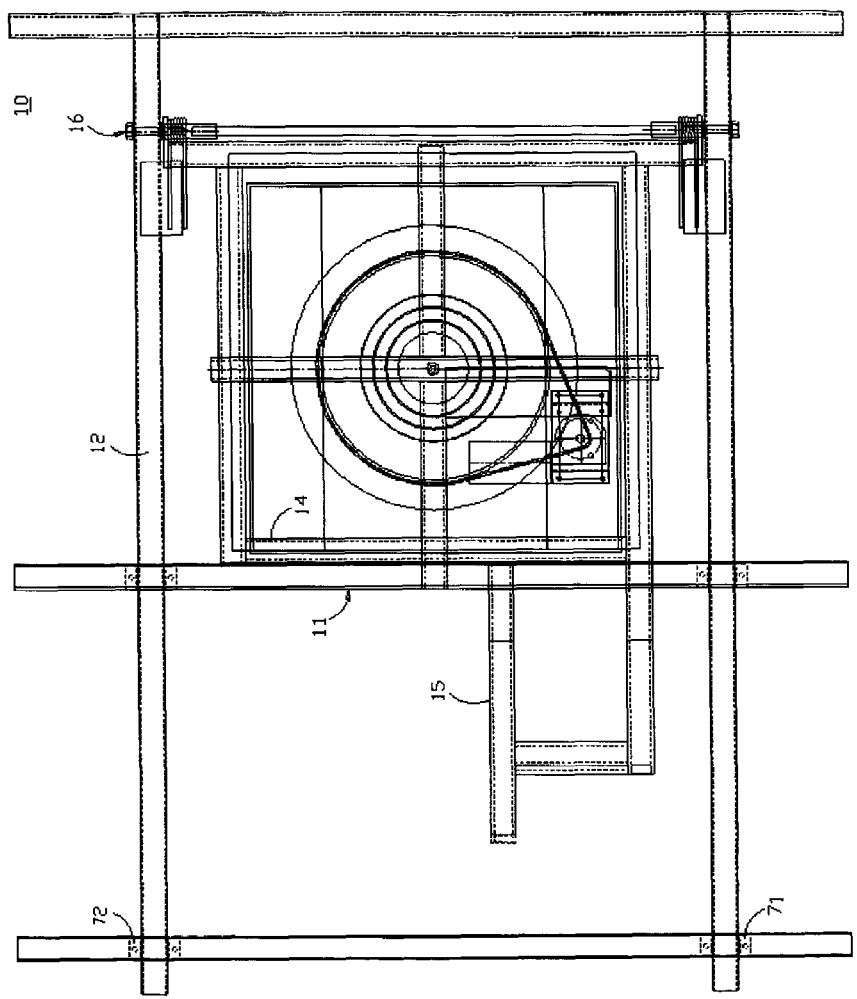

FIG. 1 is a schematic top view of a solar panel assembly 10 in accordance with the principles of this invention. The assembly comprises a base member 11 and a movable member 12 hinged to the base member and operative to move about the hinge between a collapsed position and an elevated position controllably in a manner to track the position of the sun.

Figure 2:
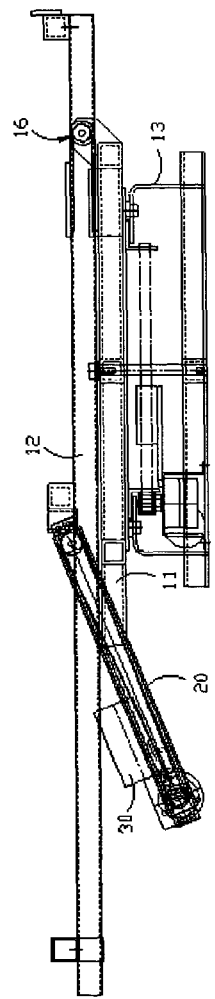
FIGS. 1, 2, and 4 are schematic top and side views of a solar panel, in accordance with the principles of this invention respectively.
Figure 3:
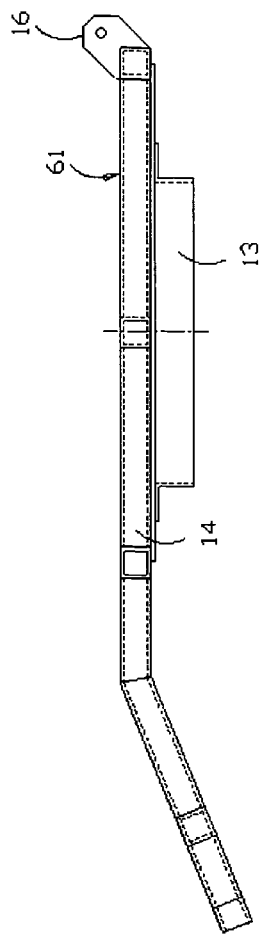
Figure 4:
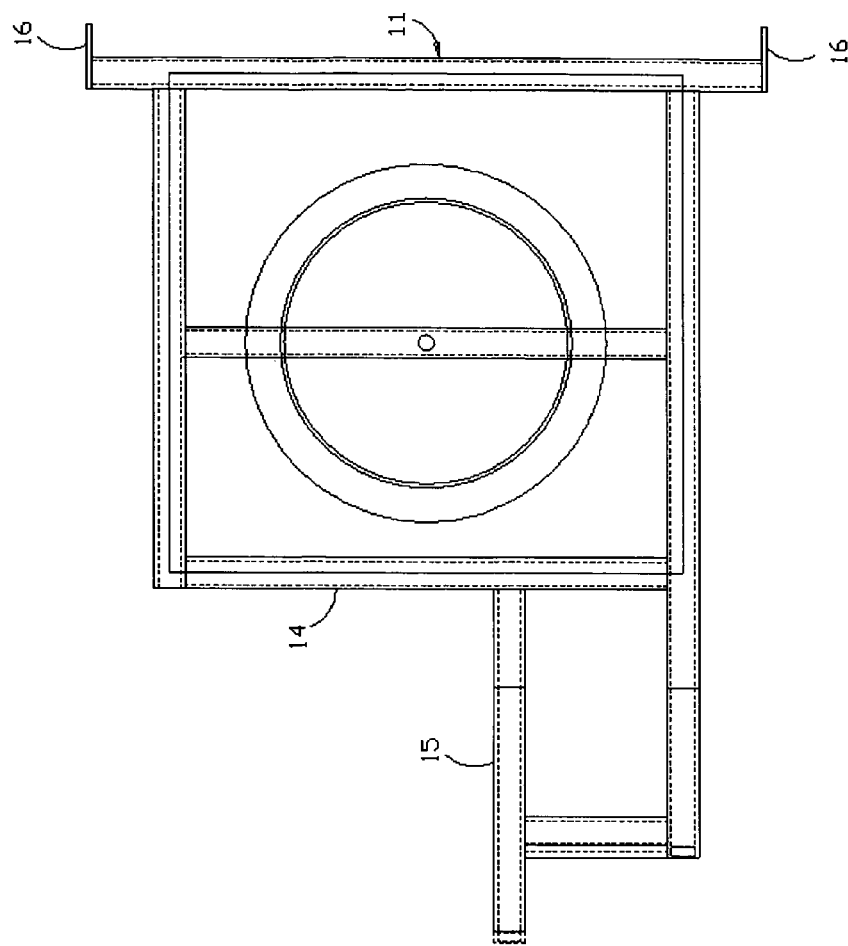
Figure 5:
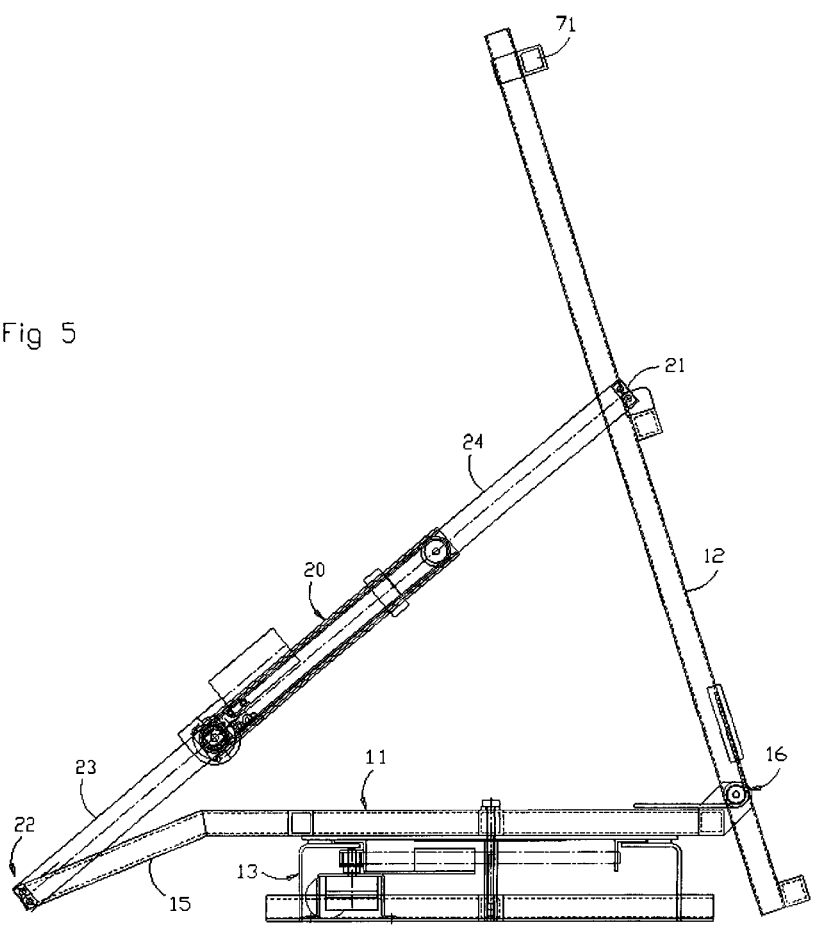
FIG. 5 is a schematic side view of the apparatus of FIGS. 1 and 2 in an elevated position.

FIG. 2 is a schematic side view of the assembly of FIG. 1 showing the movable member in a collapsed position with respect to the base member. FIG. 3 is a schematic side view of the base member alone and FIG. 4 is a schematic top view of the base member alone. FIG. 5 is a schematic side view of the assembly of FIG. 1 showing the movable member in an elevated position.

Base member 11 illustratively fits on a pedestal 13 shown in FIG. 3 and (enlarged) in FIG. 2. The pedestal is for attachment to the roof of a recreational vehicle and thus anchors the base member into a fixed position determined by the position of the vehicle.

The base member illustratively comprises a square frame 14 with an extension 15 to the left as viewed in FIG. 4. The base member also includes a hinge assembly 16 shown to the right as viewed in FIGS. 3 and 4.

Movable member 12 is connected to hinge assembly 16 and thus is constrained to move upwards and downwards with respect to base member 11 only. The apparatus 20 for so moving the movable member is shown most clearly in FIG. 5.

Apparatus 20 is connected between movable member 12, at position 21, and the left end 22 of extension 15. Apparatus 20 is operative to move elongated rigid members (rods) or arms 23 and 24 along parallel axes in opposite directions in response to the action of driver (motor) 30 shown in FIG. 2.

Apparatus 20 comprises a system of pulleys, wires and springs operative in concert to move rods 23 and 24. FIG. 6 shows an enlarged schematic side view of the apparatus. The apparatus comprises first and second subassemblies 40 and 41 for moving rods 23 and 24 respectively. Each subassembly includes a pulley arrangement and a spring arrangement which are described only in connection with subassembly 40.

With specific reference to FIG. 6, subassembly 40 includes a cable 42 conveniently comprising a wire rope. The cable is arranged in a closed loop and extends from pulley 43 to the left and idler 44 on the right as viewed in FIG. 6. Idler 44 rotates about pivot 45 and pulley 43 pivots about a shaft which is driven by motor 30 (FIG. 2). A similar arrangement is provided for a second subassembly 41 for moving rod 24. The pulleys and cables of the subassemblies (40 and 41) are driven illustratively simultaneously in directions indicated by arrows 46 and 47 in FIG. 6. Rods 23 and 24 are attached to cables 42 (and cable 42A of subassembly 41) to move in opposite directions when motor 30 is activated.

Each subassembly is operative in concert with a pair of springs 60 and 61. Each spring is connected to the base member (11) and the movable member (12) in a manner to be under tension when the movable member is in the collapsed position. Each spring also is constrained to elongate only along an axis imposed by coaxial nesting (telescoping) tubes. The springs 60 and 61 are shown in FIG. 7 along with the spring guide outer (and inner) tubes 65 and 66 respectively. An apparatus 20 including springs 60 and 61 as well as guide tubes 65 and 66 is arranged symmetrically on opposite sides of member 12 to avoid lateral stress on the member during movement. In this connection, each spring and guide assembly in effect has its own motor and they are conveniently powered to operate in concert.

Figure 8:
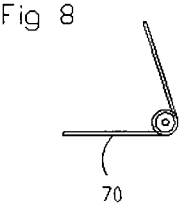

Springs 60 and 61 are configured to be under tension by the weight of movable member 12 when the pulley (wire and spring subassemblies are relaxed to permit the member 12 to lower into the collapsed position. The operation of springs 60 and 61 is assisted by a pair of torsion springs illustrated by spring 70 shown in FIG. 8. Spring 70 is located at hinge (assembly) 16 (see FIG. 5) and is compressed when member 12 is lowered. A second spring (not shown) is located at the other end of the hinge.

The spring arrangements operate to reduce the energy required to elevate member 12 from its completely collapsed position and thus reduces the size of the motor necessary for elevating the member (12).

Extension 15 shown in FIGS. 1 and 4 is provided to accommodate rods 23 and 24 and to permit the lowering of member 12 into a horizontal position. The extension (15) along with the subassemblies (40 and 41) thus not only operates to reduce energy requirements but permit a relatively low profile for the solar panels compared to the profiles realized by the prior art.

Member 12 is operative to follow the position of the sun through the day. Thus, the apparatus herein conveniently includes two pairs of sensors shown in FIGS. 1 and 5 and designated 71 and 72. The sensors operate to signal a controller (not shown) to control the angle of elevation and rotation in the manner of the prior art.

In a prototype arrangement a solar panel having dimensions of 35.5 inches×51.3 inches weighing 35 pounds was elevated by a DC motor available from LYNX Motion PGHM-17. Springs 60 and 61 had diameters of 0.875 inch with a wire diameter of 0.120 inch and, when compressed, exhibited a force of 530 pounds. Spring guide, nesting tubes 65 (and 66) were 8.5 and 11 inches long with diameters of 0.625 inches and 0.5 inches each. Rods 23 and 24 were 12 inches long and extension 15 was 7.7 inches long to accommodate elevation of member 12 to an angle of 80 degrees illustrated in FIG. 5. The drive shaft of the DC Motor is connected to a 40/1 worm gear which should be water proof and which in a prototype embodiment was taken from the windshield wiper assembly (without the motor) of a 2001 Saturn.

The apparatus (of FIGS. 1-5) for elevating member 12 is supported by pedestal 13 which operates in conventional fashion to rotate the apparatus in the horizontal plane. Any available such assembly is usable herein.

What has been described herein is considered merely illustrative of the principles of this invention and those skilled in the art may make various modifications thereof within the spirit and scope of the invention as encompassed by the following claims:

For example, the wires of the pulley assemblies may be replaced by belts. It is clear also that although a low power tracker is most useful for recreational vehicles where power is at a premium, it is also useful for stationary facilities. Also, although the invention has been described as most useful for mobile vehicles, it is also useful for installation on stationary roof tops.

What is claimed is:

1. A solar panel with apparatus for elevating a hinged solar panel member with respect to a base member, said apparatus including a pair of springs offset with respect to one another and connected between said hinged and said base member such that the springs are under tension when said hinged member is in a collapsed position, said apparatus also including first and second arms operative to move in opposite directions along parallel axes, said first arm being connected to said base member, said second arm being connected to said hinged member, said apparatus including a pulley system connected to said first and second arms and to said springs, said pulley system being operative to extend said arms controllably to elevate said hinged member, said pulley system and the weight of said hinged member being operative to extend said springs upon the withdrawal of said arms from the extended positions.

2. A solar panel with a fixed position base member and a movable member hinged to said base member at first ends thereof, said solar panel including means for elevating the opposite end of said movable member with respect to said fixed position member, said means comprising first and second arms translatable along parallel axes from non extended to extended positions, said first arm being connected to said fixed member, said second arm being connected to said opposite end of said movable member, said means also including a system of cables and pulleys connected to said first and said second arms operative to move said arms in opposite directions to elevate said opposite end of said movable member and a system of springs connected to said first and second arms in a manner to be under tension when said arms are returned to non extended positions.

3. A solar panel assembly comprising a base member and a movable member connected to said base member by a hinge, said assembly including apparatus for moving said movable member from a normally collapsed position to an elevated position with respect to said base member, said apparatus comprising first and second rigid rods constrained to move along first and second parallel axes, said first rod being connected to said base member, said second rod being connected to said movable member, said apparatus including means attached to said rods and operative to move said rods in opposite directions along said first and second parallel axes in a manner to move said movable member about said hinge controllably; said assembly including a first spring assembly; said first spring assembly comprising at least one spring connected to said first rod and said second rod in a manner to be under tension when said movable member is in a collapsed position.

4. An assembly as in claim 3 wherein said apparatus includes a pulley system and a driver connected to said pulley system, said pulley system being connected to said first and second rods for moving said rods along said first and second parallel axes in a manner to move said movable member to selected elevated positions controllably.

5. An assembly as in claim 3 wherein said first spring is constrained to extend only along a prescribed axis by a coaxial set of telescoping tubes.

6. An assembly as in claim 5 including first and second springs movable along first and second parallel axes respectively, each of said springs being constrained to move only along said first and second axes by an associated coaxial set of telescoping tubes.

7. An assembly as in claim 6 wherein said telescoping tubes encompass associated ones of said first and second springs respectively.

8. An assembly as in claim 7 including a sensor responsive to the position of the sun for signaling a driver in a manner control the elevation of said movable member.

9. An assembly as in claim 3 wherein said spring assembly comprises a pair of springs each connected between said movable member and said base member in spaced apart positions, each of said springs being constrained to respective axes via telescoping tubes.

10. An assembly as in claim 9 also including a second pair of springs, said second pair being located at the hinge between said movable member and said base member, said second pair of springs being arranged to be compressed when said movable member is in the collapsed position.

* * * * *